Nov. 29, 1927. Re. 16,802

R. M. WITHYCOMBE

TOOTHBRUSH

Original Filed June 6, 1922

Inventor
Robert Morse Withycombe
By Pierson, Eakin & Avery
Att'ys.

Reissued Nov. 29, 1927. Re. 16,802

UNITED STATES PATENT OFFICE.

ROBERT MORSE WITHYCOMBE, OF SYDNEY, NEW SOUTH WALES, AUSTRALIA.

TOOTHBRUSH.

Original No. 1,475,102, dated November 20, 1923, Serial No. 566,284, filed June 6, 1922. Application for reissue filed May 7, 1925. Serial No. 28,741.

This invention relates to brushes for cleaning the teeth, or massaging the gums in which the frictional surface is composed of soft rubber.

The object of the present invention is to provide a brush which can be constructed at comparatively low cost and in which the frictional surface is readily removable.

According to the invention, I take a narrow strip of soft rubber and divide it into serrations or filaments for a portion of its width. The strip is then wound on a former, preferably of elongated shape, under tension, the parallel or concentric layers or windings, but not the filaments, being suitably cemented or secured together.

The wound trip is then removed, the serrations or filaments forming the frictional surface. The handle or holder has a stem at the end of which is an extension having integral or secured thereon, a rigid base or core piece, approximately corresponding in shape to the said former on which base the wound strip or frictional surface is sprung so as to be held thereon.

I now refer to the accompanying sheet of drawings which illustrate one form of my invention, Fig. 1 being a perspective view of a toothbrush made in accordance with my invention.

Fig. 4 is an inverted plan of the wound strip after removal from a former, while

The same numerals indicate the same or corresponding parts.

Figure 1:
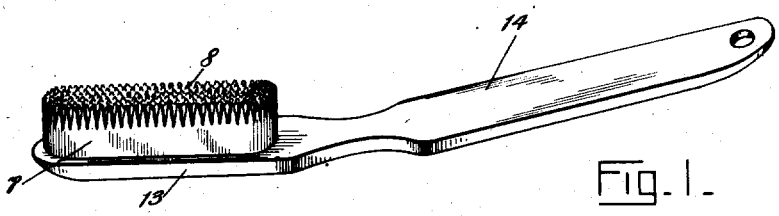
Figure 2:
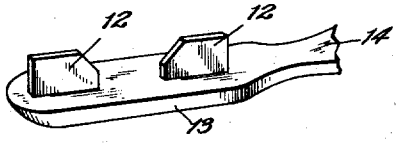
Fig. 2 is a similar view of a portion of a handle having core pieces on an extension thereof.
Figure 3:
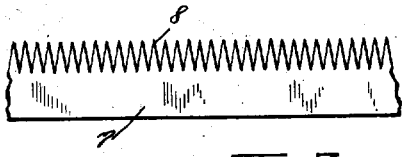
Fig. 3 represents in plan view a fragment of rubber strip divided into filaments for a portion of its width.
Figure 4:
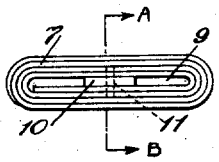
Figure 5:
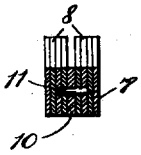
Fig. 5 is a section on line A—B, Fig. 4.

The strip of rubber 7 is cut for a portion of its width into a series of filaments or serrations 8 and the strip wound under tension on a suitable former into an elongated shape, the adjacent folds or windings being cemented or secured together. Midway in the space 9 left on removal of the former I prefer to insert a spacer piece 10 and secure it by an aluminum or other metal fastening 11. The wound strip is then sprung onto the pieces 12, 12, rigid or integral with the extension 13 of the handle 14 so that the filaments form the frictional surfaces of the brush. The wound strip is readily removable for cleaning purposes or for replacing with a new wound strip.

I claim:

1. A tooth or massage brush comprising a handle, having a pair of spaced lugs thereon, a strip of rubber serrated on one edge and wound upon itself under tension and sprung upon said lugs.

2. A tooth or massage brush comprising a handle, having a pair of spaced lugs thereon, a strip of rubber serrated on one edge and wound upon itself under tension and sprung upon said lugs, a spacer piece centrally of said rubber, and a fastening holding said spacer piece in place.

3. A brush comprising a back having a laterally projecting attachment structure, and a detachable brush body consisting of a serrated rubber strip wound upon itself and sprung upon said attachment structure.

4. A tooth or massage brush comprising a handle having a pair of spaced lugs thereon, a closed looped strip of rubber serrated on one edge and sprung upon said lugs, and spacing means secured to said strip intermediate of the ends of the loop and dividing the included space into two portions adapted to receive the respective lugs of the handle.

In witness whereof I have hereunto set my hand this 1st day of May, 1925.

ROBERT MORSE WITHYCOMBE.